(12) United States Patent
Yao

(10) Patent No.: US 10,253,227 B2
(45) Date of Patent: Apr. 9, 2019

(54) ONE-PART POLYURETHANE ADHESIVE WITH HIGH GREEN STRENGTH

(71) Applicant: SIKA TECHNOLOGY AG, Baar (CH)

(72) Inventor: Hong Yao, Boonton, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/767,670

(22) PCT Filed: Dec. 16, 2016

(86) PCT No.: PCT/EP2016/081382
§ 371 (c)(1),
(2) Date: Apr. 12, 2018

(87) PCT Pub. No.: WO2017/103070
PCT Pub. Date: Jun. 22, 2017

(65) Prior Publication Data
US 2018/0305597 A1    Oct. 25, 2018

(30) Foreign Application Priority Data

Dec. 18, 2015  (EP) ..................... 15201173

(51) Int. Cl.
| | | |
|---|---|---|
| *C09J 175/04* | (2006.01) | |
| *C08G 18/48* | (2006.01) | |
| *C08G 18/75* | (2006.01) | |
| *C08G 18/76* | (2006.01) | |
| *C08G 18/12* | (2006.01) | |
| *C08G 18/20* | (2006.01) | |
| *C08G 18/24* | (2006.01) | |
| *C09D 175/04* | (2006.01) | |
| *C08G 18/30* | (2006.01) | |
| *C08G 18/40* | (2006.01) | |
| *C08G 18/42* | (2006.01) | |
| *C08G 18/10* | (2006.01) | |
| *C08G 18/16* | (2006.01) | |
| *C08G 18/18* | (2006.01) | |
| *C09J 5/06* | (2006.01) | |

(52) U.S. Cl.
CPC ............ *C09J 175/04* (2013.01); *C08G 18/10* (2013.01); *C08G 18/12* (2013.01); *C08G 18/163* (2013.01); *C08G 18/168* (2013.01); *C08G 18/1808* (2013.01); *C08G 18/2018* (2013.01); *C08G 18/2027* (2013.01); *C08G 18/2081* (2013.01); *C08G 18/242* (2013.01); *C08G 18/307* (2013.01); *C08G 18/4018* (2013.01); *C08G 18/4233* (2013.01); *C08G 18/4238* (2013.01); *C08G 18/4288* (2013.01); *C08G 18/4804* (2013.01); *C08G 18/4808* (2013.01); *C08G 18/4825* (2013.01); *C08G 18/4829* (2013.01); *C08G 18/4841* (2013.01); *C08G 18/4891* (2013.01); *C08G 18/755* (2013.01); *C08G 18/7671* (2013.01); *C09D 175/04* (2013.01); *C09J 5/06* (2013.01); *C08G 2170/20* (2013.01)

(58) Field of Classification Search
CPC ..................................................... C09J 175/04
See application file for complete search history.

(56) References Cited

U.S. PATENT DOCUMENTS

| | | | |
|---|---|---|---|
| 5,367,036 A | 11/1994 | Saito et al. | |
| 2007/0232764 A1 | 10/2007 | Minamida et al. | |
| 2008/0185098 A1* | 8/2008 | Wu | ........................ C08G 18/10 |
| | | | 156/331.4 |

FOREIGN PATENT DOCUMENTS

| | | |
|---|---|---|
| DE | 4114022 A1 | 11/1992 |
| EP | 1153997 A1 | 11/2001 |
| WO | 2009/080740 A1 | 7/2009 |

OTHER PUBLICATIONS

Mar. 14, 2017 International Search Report issued in International Patent Application No. PCT/EP2016/081382.
Mar. 14, 2017 Written Opinion issued in International Patent Application No. PCT/EP2016/081382.

* cited by examiner

*Primary Examiner* — Daniel H Lee
(74) *Attorney, Agent, or Firm* — Oliff PLC

(57) ABSTRACT

A one-part polyurethane composition includes the reaction product of at least one polyether polyol PO, at least one thermoplastic polyester polyol PE, at least one hydrophobic polyol PH, and at least one polyisocyanate PI, preferably methylene diphenyl diisocyanate (MDI), wherein the composition has a remaining isocyanate content of between 0.8 and 3.5 wt.-%, preferably between 1.4 to 1.8 wt.-%, based on the total weight of the isocyanate-functional polymers comprised therein, and wherein said polyether polyol PO includes a bifunctional polyether polyol PO1 and a trifunctional polyether polyol PO2 and wherein said hydrophobic polyol PH is a polyester polyol based on fatty acids. The inventive one-component composition exhibits high green strength and long open time, as well as high storage stability. It is especially suitable as adhesive, in particular for automotive windshields and is preferably applied warm.

13 Claims, No Drawings

ONE-PART POLYURETHANE ADHESIVE WITH HIGH GREEN STRENGTH

TECHNICAL FIELD

The invention relates to one-component, moisture-curing polyurethane compositions that can in particular be applied in warm state and that are suitable as elastic adhesives with excellent green strength and long open time.

BACKGROUND OF THE INVENTION

Polyurethane compositions, in particular one-component polyurethane compositions, nowadays find use in various sealing and bonding applications due to their versatile mechanical and adhesion properties. They are especially suitable for elastic sealing and bonding, because, depending on the formulation, they can combine high adhesion strength with toughness and elasticity. Generally, such one-component polyurethane compositions are applied in the form of a viscous liquid or paste that cures to a soft elastic, rubberlike or tough solid, mostly by influence of humidity from air. While it is necessary for most polyurethane compositions to have a sufficiently long open time for convenient application, for certain adhesive applications it is required that the adhesive is able to hold a certain mechanical load immediately after the adhesive is applied. This is the case for example in automotive windshield repair applications, also known as aftermarket glass replacement (AGR), where the adhesive has to hold the new windshield in place immediately, while maybe allowing for some positional adjustments, before the adhesive has chemically cured. Adhesives with the ability to hold a certain load before curing are typically described as having high green strength.

Adhesive compositions with high green strength are, for example, so-called warm melt adhesives ("warm melts"), which have a highly viscous paste-like to near-solid consistency at room temperature and which for application are heated, typically to a temperature in the range from 50° C. to 100° C. The heating leads to a significant decrease in viscosity during application. The high green strength of such an adhesive stems primarily from a sharp increase in viscosity upon cooling, as result of the physical solidification of one constituent of the adhesive, known as the melting component. This melting component represents a substance which is solid at room temperature but melts when the adhesive is heated to the application temperature, and which solidifies again within a certain time, by crystallization, for example, when the adhesive is again cooled.

For example, warm melt adhesives based one-component polyurethane compositions are disclosed in U.S. Pat. No. 5,367,036. The composition described therein comprises alongside a reactive, curable polyurethane polymer a melting component in the form of a nonreactive polyurethane polymer whose isocyanate groups have been reacted with a monomer alcohol. The use of a nonreactive polyurethane polymer as melting component, however, has the disadvantage that, when the composition is cured chemically by means of moisture, the non-reactive polyurethane polymer is not chemically incorporated into the polyurethane matrix. The melting component is therefore able to migrate from the cured composition and so give rise to unwanted effects on the surface, or to lead to poorer chemical resistance, lower mechanical strength and/or poorer adhesion properties on the part of the cured composition.

Disadvantages of known polyurethane warm melts comprising reactive melting components for improved green strength on the other hand typically include their limited storage stability and their possibly premature crosslinking, thereby adversely affecting their viscosity and their solidification behavior. In general, one-part warm melt polyurethane adhesives with high green strength nowadays still suffer from short open times, as they tend to solidify too quickly after application, or they have poor storage stability or other adverse properties as described above.

Thus, there is still a need for a one-part polyurethane composition suitable for warm melt applications that combines high green strength with long open time and excellent mechanical properties and which does not suffer from poor storage stability or adverse effects from incompatible melt components.

SUMMARY OF THE INVENTION

It is an object of the present invention, therefore, to provide one-part, moisture-curing polyurethane compositions which can be applied warm and which exhibits high green strength in combination with suitable application properties and long open time, while having good storage stability, and which after curing possess good elasticity and high mechanical strength.

Surprisingly it has been found that compositions according to claim 1 achieve this object.

Accordingly, the present invention relates to a one-part polyurethane composition, comprising the reaction product of A) at least one polyether polyol PO;
B) at least one thermoplastic polyester polyol PE;
C) at least one hydrophobic polyol PH;
D) at least one polyisocyanate PI, preferably methylene diphenyl diisocyanate (MDI);

wherein the composition has a remaining isocyanate content of between 0.8 and 3.5 wt.-%, preferably between 1.4 to 1.8 wt.-%, based on the total weight of the isocyanate-functional polymers comprised therein, wherein said polyether polyol PO comprises a bifunctional polyether polyol PO1 and a trifunctional polyether polyol PO2 and wherein said hydrophobic polyol PH is a polyester polyol based on fatty acids.

The one-component, moisture-curing composition is suitable as an adhesive that can be applied warm, more particularly for industrial bonds.

DETAILED DESCRIPTION OF THE INVENTION

Compound names beginning with "poly", such as polyisocyanate or polyol designate substances, which formally contain, per molecule, two or more of the functional groups occurring in their names. The compound can be a monomeric, oligomeric or polymeric compound. For instance, a polyol is a compound having two or more hydroxyl groups and a polyisocyanate is a compound having two or more isocyanate groups.

The term "polymer" in the present document embraces on the one hand a collective of macromolecules, which, while being chemically uniform, differ in respect of degree of polymerization, molar mass, and chain length, and have been prepared by means of a polymerization reaction (addition polymerization, polyaddition or polycondensation). On the other hand, the term also embraces derivatives of such a collective of macromolecules from polymerization reactions, in other words compounds which are obtained by reactions, such as additions or substitutions, for example, of functional groups on existing macromolecules and which may be chemically uniform or chemically non-uniform. The term further embraces so-called prepolymers, in other words reactive oligomeric preadducts whose functional groups have participated in the synthesis of macromolecules.

The term "polyurethane polymer" embraces all polymers that are prepared by the process known as the diisocyanate polyaddition process. This also includes those polymers that are virtually or entirely free of urethane groups. Examples of polyurethane polymers are polyether-polyurethanes, polyester-polyurethanes, polyether-polyureas, polyureas, polyester-polyureas, polyisocyanurates, and polycarbodiimides.

The average molecular weight is understood to mean the number average molecular weight, as determined using conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane as a solvent, at 35° C. The "melting point" of a substance refers in the present document to the maximum of the heating curve, measured by means of differential scanning calorimetry (DSC) with a heating rate of 2° C./min.

"Room temperature" refers to a temperature of 23° C. "Relative humidity", abbreviated "r.h." and expressed in percent, describes, according to general knowledge, the amount of gaseous water in a respective atmosphere relative to the saturation amount at a given temperature and under normal ambient pressure.

Weight percent, abbreviated "wt.-%", describes a percentage amount of an individual component of a composition, based on the total weight of the composition if not explicitly described otherwise. "Weight" and "mass" are used interchangeably in this document.

The "green strength" of a warm melt adhesive is the strength possessed by an adhesive bond after the joining of the adhesion substrates and the, at least partial, cooling of the adhesive towards room temperature, at a point in time at which the chemical curing of the adhesive by means of moisture has not yet substantially advanced.

The "open time" of an adhesive refers to the time span, calculated from the point in time at which the adhesive is applied, within which the substrates should be joined together.

All industrial norms or standards mentioned in this document are referring to the respective current version at the time of filing.

The composition used according to the invention is a one-part or single component composition, i.e. the composition comprises one component. Optionally however, one or more additional components may be included for specific purposes. For instance, an additional component comprising coloring agents such as pigments may be used for coloring purposes.

The inventive one-part polyurethane composition comprises as a first essential component at least one polyether polyol PO.

Examples of polyether polyols PO are polyoxyethylenepolyols, polyoxy-propylenepolyols and polyoxybutylenepolyols, in particular polyoxyethylene-diols, polyoxypropylenediols, polyoxybutylenediols, polyoxyethylenetriols and polyoxypropylenetriols. Polyoxyalkylenediols or polyoxyalkylenetriols having a degree of unsaturation of less than 0.02 meq/g and having an average molecular weight in the range from 1000 to 30000 g/mol and polyoxyethylene-diols, polyoxyethylenetriols, polyoxypropylenediols and polyoxypropylenetriols having an average molecular weight of from 400 to 8000 g/mol are suitable.

Further examples of polyether polyols PO are so-called ethylene oxide-terminated ("EO-endcapped", ethylene oxide-end-capped) polyoxypropylenepolyols, styrene-acrylonitrile-grafted polyetherpolyols, e.g. Lupranol® from BASF Polyurethanes GmbH, Germany.

The polyols mentioned above usually have a relatively high molecular weight, for instance, an average molecular weight of from 250 to 30000 g/mol, in particular from 1000 to 30000 g/mol, and/or preferably an average OH functionality in the range from 1.6 to 3. It may be advantageous to use a combination of differently functional polyether polyols PO, for example a combination of difunctional polyether polyols having two hydroxyl groups with trifunctional polyether polyols having 3 hydroxyl groups.

Polyether polyol PO is preferably comprised in the composition with an amount of between 5 wt.-% and 50 wt.-%, preferably between 10 wt.-% and 35 wt.-%, based on the total weight of the composition.

In a preferred embodiment, polyether polyol PO comprises at least two different polyether polyols PO1 and PO2. In an especially preferred embodiment, polyether polyol PO1 is a bifunctional polyol and polyether polyol PO2 is a trifunctional polyol.

Polyether polyol PO1 is preferably comprised in the composition with an amount of between 0.25 wt.-% and 15 wt.-%, preferably between 0.5 wt.-% and 5 wt.-%, based on the total weight of the composition. Polyether polyol PO2 is preferably comprised in the composition with an amount of between 5 wt.-% and 35 wt.-%, preferably between 10 wt.-% and 30 wt.-%, based on the total weight of the composition.

The inventive one-part polyurethane composition comprises as a second essential component at least one thermoplastic polyester polyol PE.

Thermoplastic polyester polyols PE are solid or essentially solid at room temperature (23° C.) but liquefy at higher temperatures, e.g. at temperatures above 80° C., preferably above 60° C., more preferably above 40° C. They preferably exhibit a linear structure and preferably are able to crystallize at least partially when cooling at temperatures below their melting temperature.

Such polyester polyols PE are generally linear and have an average molecular weight, Mn, of typically in the range of about 500 to about 7000 g/mol, desirably from about 1000 to about 6000 g/mol, and preferably from about 2500 to about 4000 g/mol. The number average molecular weight can be estimated, for example, by assay of the number of terminal functional groups for a given weight of polymer. Suitable hydroxyl terminated polyester polyols PE generally have an acid number of about 1.3 or less and typically about 0.8 or less. The acid number refers to the number of milligrams of potassium hydroxide needed to neutralize one gram of the hydroxyl terminated polyester polyols.

Suitable hydroxyl terminated thermoplastic polyester polyols PE are typically produced by esterification reactions of one or more dicarboxylic acids or anhydrides using one or more glycols or by transesterification reactions of one or more esters of dicarboxylic acids with one or more glycols. An excess mole ratio of glycol to acid or anhydride is utilized in order to obtain terminal hydroxyl groups.

Suitable dicarboxylic acids for preparing a hydroxyl terminated polyester polyol intermediate can be aliphatic, cycloaliphatic, aromatic or combinations thereof. A single dicarboxylic acid or a combination of dicarboxylic acids can be used.

Typically, the dicarboxylic acids have a total of from 4 to about 15 carbon atoms. Examples of suitable dicarboxylic acids include succinic, glutaric, adipic, pimelic, suberic, azelaic, sebacic, dodecanedioic, isophthalic, terephthalic, and cyclohexane dicarboxylic acids, and the like. Anhydrides of the above dicarboxylic acids, such as phthalic anhydride, tetrahydrophthalic anhydride, and the like, can also be used. Preferred acids include adipic, suberic, sebacic and azelaic. Most preferred is adipic acid.

If the transesterification route for formation of the hydroxyl terminated polyester polyol PE is used, esters of the dicarboxylic acids described above can be employed. These esters typically include an alkyl group, usually having 1 to 6 carbon atoms, in place of the acidic hydrogen of the corresponding acid functionalities.

Suitable glycols which are reacted to form the hydroxyl terminated polyester polyol PE can be aliphatic, aromatic, or combinations thereof. The glycols typically have a total of from 2 to 12 carbon atoms. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 3-methyl-1,5-hexanediol, 1,4-cyclohexanedimethanol, decamethylene glycol, dodecamethylene glycol, 1,12-hydroxystearyl alcohol, and the like. Preferred glycols include 1,4-butanediol and 1,6-hexanediol.

Also suitable are polyester polyols that are produced from lactones, such as, for example, γ-caprolactone (gamma-caprolactone).

A preferred polyester polyol PE comprises poly(1,6-hexamethylene adipate). Another or the same preferred polyester polyol PE comprises a hydroxyl-terminated polyester made from from dodecanoic diacid and 1,6-hexanediol. Most preferred polyester polyol PE comprises poly(1,6-hexamethylene adipate).

The hydroxyl-terminated polyester polyol PE preferably has an OH value of 20 to 50 mg KOH/g.

The hydroxyl-terminated polyester polyols PE suitable for the present invention are for example commercially available from Evonik as Dynacoll®, from Crompton Corp. as Fomrez®, from Inolex as Lexorez®, or from Polyurethane Specialties as Millester®.

Polyester polyol PE is preferably comprised in the composition with an amount of between 0.5 wt.-% and 10 wt.-%, preferably between 1 wt.-% and 5 wt.-%, based on the total weight of the composition.

The inventive one-part polyurethane composition comprises as a third essential component least one hydrophobic polyol PH.

A hydrophobic polyol in the sense of the present invention is a polyhydroxy-functional, preferably dihydroxy-functional, compound that is non-miscible or essentially non-miscible with water. This typically means that it comprises in its molecular structure large sections with linear or branched hydrocarbon moieties and no or only very limited polar functional groups, in particular functional groups that are able to form hydrogen bonds with water. Such hydrophobic molecules are normally derived from polyolefins or natural or synthetic fatty acids.

Particularly preferred hydrophobic polyols PH to be used in the present invention are polyhydroxy-functional fats and oils or derivatives thereof, for example natural fats and oils, such as castor oil derivatives, or polyols obtained by chemical modification of natural fats and oils, so-called oleochemical polyols.

Examples of chemically modified natural fats and oils are polyols obtained from epoxypolyesters or epoxypolyethers obtained, for example, by epoxidation of unsaturated oils, by subsequent ring opening with carboxylic acids or alcohols, polyols obtained by hydroformylation and hydrogenation of unsaturated oils, or polyols which are obtained from natural fats and oils by degradation processes, such as alcoholysis or ozonolysis, and subsequent chemical linkage, for example by trans esterification or dimerization, of the degradation products thus obtained or derivatives thereof. Suitable degradation products of natural fats and oils are in particular fatty acids and fatty alcohols and fatty acid esters, in particular the methyl esters (FAME), which can be derivatized, for example, by hydroformylation and hydrogenation to give hydroxy-fatty acid esters.

Especially suitable hydrophobic polyols PH for the present invention are hydroxyl-functional so-called fatty ester dimers that are derived from natural oils. In preferred embodiments, the hydrophobic polyol PH is a polyester polyol based on fatty acids. In particular suitable among those are semi-crystalline polyester polyols with an average molecular weight of between 1000 and 3000 g/mol, preferably between 2000 and 3000 g/mol. These are for example available under the trade name Priplast® from Croda, or under the trade name Radia® from Oleon.

The hydrophobic polyol PH preferably has an OH value of 30 to 75 mg KOH/g.

In preferred embodiments, the hydrophobic polyol PH has a viscosity at 25° C. according to ASTM D4878-15 of between 5 Pa s and 150 Pa s, preferably between 7 and 100 Pa s, more preferably between 10 and 75 Pa s.

Hydrophobic polyol PH is preferably comprised in the composition with an amount of between 2 wt.-% and 40 wt.-%, preferably between 2.5 wt.-% and 30 wt.-%, based on the total weight of the composition.

Additional to the above-mentioned essential polyols, small amounts of low molecular weight di- or polyhydric alcohols, e.g., with a molecular weight of less than 250 g/mol, may be optionally used in the inventive composition. Examples thereof are 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures thereof.

The inventive one-part polyurethane composition furthermore comprises at least one polyisocyanate PI.

Examples for suitable polyisocyanates PI include hexamethylene diisocyanate (HDI), HDI trimers such as Desmodur®N 3600 from Bayer, toluene diisocyanate (TDI), isophorone diisocyanate (IPDI) such as Vestanat®T 1890 from Evonik, methylene diphenyl diisocyanate (MDI) such as Mondur®M from Bayer and derivatives of these polyisocyanates, wherein HDI and its derivatives, IPDI and its derivatives, and MDI and its derivatives are preferred. Most preferred is MDI.

Monomeric and polymeric methylene diphenyl diisocyanate (MDI) is most preferred. A plurality of different product grades of MDI is available and suitable for the present invention. The term "methylene diphenyl diisocyanate" as used in the present invention, includes, depending on its grade, monomeric and polymeric methylene diphenyl diisocyanate and, also depending on its grade, the three different isomers, namely 4,4'-methylene diphenyl diisocyanate (4,4'-MDI), 2,4'-methylene diphenyl diisocyanate (2,4'-

MDI), and 2,2'-methylene diphenyl diisocyanate (2,2'-MDI). The nature and different grades of MDI and its commercially available forms are well known to the averagely skilled person in the art.

The inventive on-part polyurethane composition comprises at least the components described above, i.e. several polyols and at least one polyisocyanate. It is possible and may be advantageous to combine these compounds unreacted into a mixture, where a reaction product forms in situ. The reaction between the hydroxyl groups of the several polyols PO, PE, and PH and the isocyanate groups of the polyisocyanate PI occurs at least partially in a spontaneous manner at room temperature due to the high reactivity of these chemical species with each other. This leads to the formation of a polyurethane polymer. Care has to be taken, however, that the amount of isocyanate groups in such a mixture is in a molar excess regarding the amount of the hydroxyl groups of the polyols. It is crucial that the resulting polyurethane polymer is at least predominantly endcapped with polyisocyanate and thus isocyanate-functional. These remaining isocyanate groups enable a crosslinking reaction of the polyurethane polymer during and after application under the influence of humidity. It is therefore preferable that such an in situ reaction product polyurethane polymer has a remaining isocyanate content of between 0.8 and 3.5%, preferably between 1.4 to 1.8%.

In another embodiment, some of the polyols may be reacted beforehand with parts of the polyisocyanate PI to form so-called prepolymers PR. Such preopolymers PR may be isocyanate-functional or hydroxyl-functional and may be further reacted with other polyols and additional polyisocyanates to form the desired final isocyanate-functional polyurethane. This approach has the advantage that the polyurethane formation may be more controlled and lead to specific, optimized properties. On the other hand, the in situ approach described above has the advantage that fewer process steps are involved, which might lead to a more cost-efficient production process. Also in the process involving the formation of an isocyanate-functional prepolymer PR the total amount of polyisocyanate PI is adjusted such that the finally remaining isocyanate content of the final reaction product is between 0.8 and 3.5%, preferably between 1.4 to 1.8%.

Polyisocyanate PI is preferably comprised in the composition with an amount of between 2 wt.-% and 20 wt.-%, preferably between 5 wt.-% and 15 wt.-%, based on the total weight of the composition.

In preferred embodiments, the inventive one-part polyurethane composition comprises at least one catalyst K for curing isocyanate-functional polyurethanes.

Catalysts K include compounds that accelerate the reaction of the isocyanate groups with hydroxyl and/or amine groups to form urethane bonds and/or urea bonds or the reaction of isocyanate groups with water to form primary amino groups.

Catalysts K which accelerate the reaction of the isocyanate groups with water include, in particular, metal compounds, examples being tin compounds such as dibutyltin diacetate, dibutyltin dilaurate, dibutyltin distearate, dibutyltin diacetylacetonate, dioctyltin dilaurate, dibutyltin dichloride, and dibutyltin oxide, tin(II) carboxylates, stannoxanes such as laurylstannoxane, bismuth compounds such as bismuth(III) octoate, bismuth(III) neodecanoate or bismuth(III) oxinates; and also tertiary amines, examples being 2,2' dimorpholinodiethyl ether and other morpholine ether derivatives, 1,4 diazabicyclo[2.2.2]-octane, and 1,8 diazabicyclo[5.4.0]undec-7-ene. There may also be combinations of the stated catalysts K present, especially mixtures of tertiary amines and metal compounds.

A typical amount of catalyst K is customarily 0.005% to 1% by weight, based on the overall composition, it being clear to the person skilled in the art what quantities are sensible for which catalysts.

Catalyst K is preferably comprised in the composition with an amount of between 0.1 wt.-% and 1 wt.-%, preferably between 0.2 wt.-% and 0.55 wt.-%, based on the total weight of the composition.

If a combination of a metal compound, preferably a tin complex, and a tertiary amine, preferably 2,2' dimorpholino diethyl ether, is used, the metal compound is preferably comprised in the composition with an amount of between 0.01 wt.-% and 0.05 wt.-%, preferably between 0.0.2 wt.-% and 0.05 wt.-%, based on the total weight of the composition, and the tertiary amine is preferably comprised in the composition with an amount of between 0.1 wt.-% and 0.5 wt.-%, preferably between 0.2 wt.-% and 0.4 wt.-%, based on the total weight of the composition.

The inventive one-part polyurethane composition furthermore preferably comprises at least one filler F, preferably one or more selected from the group comprising carbon black, chalk, clay powder, and polyvinyl chloride powder. The filler F advantageously influences, for example, both the consistency of the uncured composition and the mechanical properties of the cured composition.

Suitable fillers F include organic and inorganic fillers, examples being natural, ground or precipitated calcium carbonates, with a coating, optionally, of fatty acids, more particularly stearates; calcined kaolins, aluminum oxides, aluminum hydroxides, barytes ($BaSO_4$, also called heavy spar), silicas, especially highly disperse silicas from pyrolysis processes, carbon blacks, especially industrially produced carbon blacks (referred to herein as "carbon black"), PVC powders or hollow spheres. Preferred fillers are carbon black, chalk, clay powder, and polyvinyl chloride powder.

It may be of advantage to use a mixture of different fillers F. Most preferred is a combination of PVC powder and carbon black.

A suitable amount of filler F is, for example, in the range from 10% to 70% by weight, preferably 20% to 60% by weight, based on the overall composition. Filler F is preferably comprised in the composition with an amount of between 10 wt.-% and 50 wt.-%, preferably between 20 wt.-% and 40 wt.-%, based on the total weight of the composition.

The inventive one-part polyurethane composition furthermore preferably comprises a thixotropy additive TX. Thixotropy additives include rheology modifiers such as, for example, thickeners or thixotropic agents, examples being urea compounds, polyamide waxes, modified clays, bentonites or fumed silicas. These compounds may advantageously influence the rheology of the composition, by e.g. enabling a higher viscosity under low shear forces, but at the same time enabling a lower viscosity under higher shear forces. This may facilitate the application, e.g. by enabling a lower viscosity of the composition during extrusion by force from a container.

In preferred emboidiments, the thixotropy additive TX comprises the reaction product of a polyisocyanate, preferably MDI, and primary monoalkylamines, preferably N-butylamine, suspended in a plasticizer, the plasiticizer preferably being a phthalate ester. Such a reaction product should be manufactured in a way that it does not comprise any more isocyanate groups in significant amounts, i.e. by using a slight molar excess of primary amino groups with respect to isocyanate groups. A suitable molar excess is, for example, 1 to 10%.

Thixotropy additive TX is preferably comprised in the composition with an amount of between 12 wt.-% and 10 wt.-%, preferably between 4 wt.-% and 8 wt.-%, based on the total weight of the composition.

The inventive one-part polyurethane composition furthermore optionally but preferably comprises at least one plasticizer.

Suitable plasticizers include for example esters of organic carboxylic acids or their anhydrides, for example, phthalates such as dioctyl phthalate, diisononyl phthalate or diisodecyl phthalate, benzyl phthalates, e.g. Santicizer®160, terephthalates and diisopropylbenzene, e.g. Benzoflex®9-88, benzoates, adipates such as dioctyl adipate, cyclohexane esters, such as diisononyl cyclohexane-1,2-dicarboxylate, azelates and sebacates; organic phosphoric and sulfonic esters, and polybutenes. Preferred plasticizers include phthalate esters.

Plasticizer is preferably comprised in the composition with an amount of between 5 wt.-% and 25 wt.-%, preferably between 10 wt.-% and 20 wt.-%, based on the total weight of the composition.

Apart from the above mentioned ingredients, the inventive one-part polyurethane composition may optionally contain further additives. Such additives are commonly used, if desired, and typically known to the persons skilled in the art. Examples of optional further additives include pigments, such as inorganic and organic pigments, e.g. Bayferrox® and Heucosin®; dryers, such as, for example, molecular sieves, calcium oxide, highly reactive isocyanates such as p tosyl isocyanate, orthoformic esters, alkoxysilanes such as tetraethoxysilane, organoalkoxysilanes such as vinyltrimethoxysilane, and organoalkoxysilanes which have a functional group in alpha position to the silane group; adhesion promoters, especially organoalkoxysilanes, referred to below as "silanes", such as, for example, epoxysilanes, vinylsilanes, (meth)acrylosilanes, isocyanatosilanes, carbamatosilanes, S-(alkylcarbonyl)-mercaptosilanes, and aldiminosilanes, and also oligomeric forms of these silanes; stabilizers against heat, oxidation, light, and UV radiation; flame retardants; surface-active substances such as, for example, wetting agents, flow control agents, deaerating agents or defoamers, such as solvent free and silicon free defoamers, e.g. solvent free and silicon free polymer-based defoamers, and polyorganosiloxanes, e.g. Tego®Airex and Efka®; and emulsifiers such as calcium hydroxide; biocides, such as algicides, fungicides or fungal growth inhibitors, for example;
and also further substances customarily employed in one-part polyurethane compositions and well-known to the person with average skill working in the field of polyurethane formulation.

A preferred method of manufacturing a preferred embodiment of the one-part polyurethane composition according to the present invention at least comprises the steps
a) mixing polyester polyol PE, a difunctional polyether polyol PO1, and parts of polyisocyanate PI to form an isocyanate-functional prepolymer PR;
b) mixing a trifunctional polyether polyol PO2, hydrophobic polyol PH, and the rest of polyisocyanate PI;
c) adding filler F and optionally thixotropy additive TX;
d) adding prepolymer PR prepared under step a);
e) adding catalyst K for curing isocyanate-functional polyurethanes;
wherein all steps optionally include the addition of plasticizer, heating, cooling, and/or use of vacuum or inert gas.

Another preferred method of manufacturing a preferred embodiment of the one-part polyurethane composition according to the present invention at least comprises the steps
a) mixing polyester polyol PE, a difunctional polyether polyol PO1, and parts of polyisocyanate PI to form an isocyanate-functional prepolymer PR1;
b) mixing difunctional polyether polyol PO1, trifunctional polyether polyol PO2 and parts of polyisocyanate PI to form an isocyanate-functional prepolymer PR2;
c) optionally mixing a difunctional polyether polyol PO1, hydrophobic polyol PH, polyester polyol PE and parts of polyisocyanate PI to form an isocyanate-functional prepolymer PR3;
d) introducing filler F, preferably additional hydrophobic polyol PH and optionally thixotropy additive TX to a reactor;
e) adding prepolymers PR1, PR2, and optionally PR3 prepared under steps a) to c);
f) adding catalyst K for curing isocyanate-functional polyurethanes;
wherein all steps optionally include the addition of plasticizer, heating, cooling, and/or use of vacuum or inert gas.

It is advantageous to select all the mentioned components optionally present in the composition, particularly filler and catalysts, in such a manner that the storage stability of the composition is not influenced negatively by the presence of such a component, which means that this composition undergoes no change or only little change during storage, in terms of its properties, particularly the application and curing properties. Consequently, reactions leading to chemical curing of the described composition, particularly reactions of the remaining isocyanate groups, for example with water, should not occur to a significant extent during storage. It is therefore particularly advantageous that the mentioned components contain or release no or at most only traces of water during storage. Therefore it can be advantageous to chemically or physically dry certain components before mixing them in the composition.

Therefore, the above-described inventive composition is preferably prepared and stored in airtight containers with exclusion of moisture. Typically, the composition is stable during storage, which means that it can be stored for a time period from several months to one year and longer, with exclusion of moisture, in an appropriate packaging or arrangement, such as, for example, a drum, a pouch or a cartridge, without undergoing any change, in terms of its application properties or its properties after curing, to an extent of relevance for its use. Usually, the storage stability is determined by measuring the viscosity or the push out force or extrusion force.

Another aspect of the present invention is the use of an inventive one-part polyurethane composition as an adhesive or sealant, preferably as an adhesive, more particularly as a warm melt adhesive.

Preferably, the inventive composition is used as an adhesive for glass, metal, or ceramic frit substrates.

For application, the inventive one-part polyurethane composition is preferably heated to an application temperature of between 30° C. and 120° C., preferably between 40° C. and 100° C., more preferably between 60° C. and 90° C. Suitable applications are, for example, the adhesive bonding of components in construction or civil engineering, and in the manufacture or repair of industrial goods or consumer goods, more particularly of windows, household appliances or means of transport such as water or land vehicles, preferably automobiles, buses, trucks, trains or ships; or the sealing of joints, seams or cavities in industrial manufacture or repair, or in construction or civil engineering. The inventive one-part polyurethane composition is preferably used to bond a window or windshield to a building or vehicle, in particular an automotive vehicle. The application process is described in detail below.

In its application as an adhesive, the moisture-curing composition is used for adhesively bonding a substrate S1 and a substrate S2.

An adhesive bonding method of this kind preferably comprises the steps of i') applying the above-described composition to the substrate S1;

ii') contacting the applied composition with the substrate S2 within the open time;

iii') chemically crosslinking the composition with moisture;

the substrate S2 being composed of the same or a different material from the substrate S1.

With particular preference the composition described is used as a warm melt adhesive, which is applied in a warm state.

In its application as a warm melt adhesive, the above-described composition is used for adhesively bonding a substrate S1 and a substrate S2.

An adhesive bonding method of this kind preferably comprises the steps of i) heating the composition to a temperature of between 30° C. and 120° C., preferably between 40° C. and 100° C., more preferably between 60° C. and 90° C.;

ii) applying the heated composition to the substrate S1;

iii) contacting the applied composition with the substrate S2 within the open time.

Optionally, step iii) may be followed by a step iv) of displacing the substrate S1 relative to the substrate S2.

Step iii), or optionally step iv), is followed by a step v) of chemically curing the composition with moisture. The person skilled in the art understands that the curing reaction, as a function of factors such as the composition used, the substrates, the temperature, the ambient humidity and the adhesive-bonding geometry, may even begin during the adhesive bonding procedure. The major part of the chemical curing, however, generally takes place after the joining operation.

At the time of the application of the described composition to at least one solid or article, the silane groups contained in the composition come in contact with moisture. The silane groups have the properties of hydrolyzing in contact with moisture. In the process, organosilanols form, and, as a result of subsequent condensation reactions, organosiloxanes. As a result of these reactions, which can be accelerated by using catalysts, the composition finally completely cures. The process is also referred to as crosslinking.

The water needed for curing can originate either from air (atmospheric moisture), or the above-described composition can be contacted with a water-containing component, for example, by brushing, for example, with a smoothing agent, or by spraying, or a water-containing component can be added to the composition at the time of the application, for example, in the form of a water-containing paste which is mixed in, for example, using a static mixer.

During the curing by atmospheric moisture, the composition cures from outside to inside. The curing rate is determined by various factors, such as, for example, the diffusion rate of the water, the temperature, the environmental moisture, and the adhesive geometry, and as a rule it decreases as the curing progresses.

The substrate S1 may be the same as or different from substrate S2. Suitable substrates S1 or S2 are, for example, inorganic substrates such as glass, glass ceramic, concrete, mortar, brick, tile, plaster and natural stones such as granite or marble; metals or alloys such as aluminum, steel, non-ferrous metals, galvanized metals; organic substrates such as wood, plastics such as PVC, polycarbonates, PMMA, polyethylene, polypropylene, polyesters, epoxy resins; coated substrates such as powder-coated metals or alloys; and also paints and finishes, especially automobile topcoats. Preferably one of the substrates, S1 or S2, is a glass or a glass ceramic, more particularly in the form of a glazing sheet. With particular preference one of the substrates, S1 or S2, is a vehicle glazing sheet, more particularly an automobile glazing sheet.

Where necessary, the substrates S1 and/or S2 may be pretreated before the above-described composition is applied. Such pretreatments include, in particular, physical and/or chemical cleaning techniques, examples being abrading, sandblasting, brushing or the like, or treatment with cleaners or solvents; or the application of an adhesion promoter, an adhesion-promoter solution or a primer; or a flame or plasma treatment, more particularly an air-plasma pretreatment at atmospheric ambient pressure.

Adhesive bonding of the substrates S1 and S2 by means of the above-described composition produces an adhesively bonded article. An article of this kind may be a built structure, more particularly a built structure in construction or civil engineering, or it may be an industrial good or a consumer product such as, for example, a window, a household appliance or a means of transport, such as a water or land vehicle, for example, more particularly an automobile, a bus, a truck, a train or a ship, or a component for installation therein or thereon.

For application of the above-described composition as an adhesive for elastic bonds, such as in vehicle construction, for example, the composition at the application temperature preferably has a paste like consistency with properties of structural viscosity. A paste like adhesive of this kind is applied to the substrate by means of a suitable apparatus. Suitable methods of application are, for example, application from commercially customary cartridges, which are operated manually or by means of compressed air, or from a drum or hobbock by means of a conveying pump or an extruder, optionally by means of an application robot. For application of the composition as an adhesive for elastic bonds, such as in vehicle construction, for example, which require a good green strength, the adhesive is heated to the required application temperature, to 40° C. to 80° C., for example, prior to the application, by means of a suitable method, as, for example, by means of sufficient storage of the respective adhesive in the pack at the corresponding temperature, and/or through the use of a heatable container, and/or through the conveying of the adhesive through a heatable application apparatus. In that case, the adhesive at the application temperature preferably has a paste like consistency with not too high a viscosity, while the consistency at room temperature is significantly firmer to solid, depending on the green strength requirements.

An adhesive on application preferably features sag resistance and short stringing. That is, it remains in the applied form following application, in other words does not run apart, and, after the application device has been set down, the adhesive forms very short strings, if any at all, so that the substrate and the application device are, as far as is possible, not fouled.

Where the above-described composition is used as an adhesive for elastic bonds, such as in vehicle construction, for example, the composition is applied preferably in the form of a bead having a substantially circular or triangular cross-sectional area.

Elastic bonds in vehicle construction, for example, include, for example, the adhesive attachment of parts, such as plastic covers, trim strips, flanges, bumpers, driver's cabs or other components for installation, on a vehicle, or the bonding of glazing sheets into a vehicle. Vehicles shall include, for example, automobiles, trucks, buses, rail vehicles, and ships.

The above-described composition is preferably used for the bonding of glazing sheets into a vehicle, more particularly into an automobile.

The composition described above is applied preferably at an elevated temperature, more particularly at 30° C. to 120° C., preferably at 40° C. to 100° C., more preferably at 60° C. to 90° C. Alternatively, depending on the nature of the composition, it may also be applied at room temperature or below.

The inventive composition is however suitable to be cured after application in a broad range of ambient temperatures. It cures conveniently at temperatures ranging from 5° C., or even below, up to temperatures of 50° C., or higher. For windshield adhesive applications, ambient temperatures ranging from about 0° C. to about 40° C. are realistic and do not significantly hamper the performance of the inventive composition. For industrial applications, higher temperatures of more than 100° C., up to, for example, 150° C. are possible, which are also not detrimental to the performance of the inventive composition. Care has to be taken, however, that in all cases sufficient humidity is present for the curing mechanisms to take place. This may depend on relative humidity from air, or additional humidity provided. Furthermore, if extremely high temperatures (e.g., 120° C., or higher) are used during curing, chemical precautions have to be considered, such as the addition of antioxidants or similar protective measures, as such temperatures may cause chemical degradation of parts of the compositions over time.

Another aspect of the present invention is a partially or completely cured one-part polyurethane composition as described above. Curing takes place under the influence of moisture, typically from air. Water reacts during the curing process with the remaining isocyanate groups to partially form primary amino groups, which then react further with other remaining isocyanate groups under formation of urea bonds.

Another aspect of the present invention is a manufacturing product comprising an inventive one-part polyurethane composition as described above.

The invention is further explained in the following experimental part which, however, shall not be construed as limiting the scope of the invention.

EXAMPLES

Test Methods

Tensile strength, Elongation at break, and Young's modulus were measured according to DIN EN ISO 527 (traction speed 200 mm/min) with samples cured over 14 days at 23° C. and 50% r.h. and having a sample thickness of 2 mm.

Lap shear strength was measured based on ISO 4587/DIN EN 1465 on a testing apparatus Zwick/Roell Z005. For this, two 6 mm clean float glass sample coupons were bonded by the adhesive composition and the adhesive cured over 14 days at 23° C. and 50% r.h. (adhesion area: 12×25 mm; layer thickness: 4.0 mm; traction speed: 10 mm/min; temperature 23° C.; relative humidity: 50%).

Thixotropic properties (as shown in Table 6) were measured by application of a cylindrical adhesive mass with a diameter of 2 cm and a length of 4 cm out of a cartridge onto a vertical cardboard sheet. The cartridge was stored over 7 days at 23° C. prior to the experiment and heated to 80° C. immediately before application for 1 hour and was applied in warm state. If the protruding end of the adhesive mass sank less than 1 cm relative to its initial position after 1 day, the experiment was designated "1". If the relative sinking after 1 day was 1 cm or more, but less than 2 cm, the experiment was designated "2". A second experiment with the same composition was performed with another cartridge that was stored at 60° C. during 7 days prior to the experiment to simulate ageing of the composition and thus to determine storage stability. Otherwise, the experiment was performed identically.

Tack-free time, also known as skin-formation time and an indication for reactivity and curing speed, was determined with three samples of each composition applied at three different conditions (temperature and relative humidity, according to the details shown in Table 6). The measurement itself was performed by applying a small amount (with a thickness of about 2 mm) of adhesive on a cardboard sheet and measuring the time until the surface so much cured as being tack-free. To determine this, the surface was slightly touched with a LDPE pipet in 1 min intervals and the time recorded until no more residues were sticking to the pipet.

For the determination of the extrusion force each composition was filled in a cartridge. The cartridges were stored at 23° C. during 7 days and heated to a temperature of 80° C. for 1 hour prior to the determination of the extrusion force. Then, while still at 80° C., the cartridges were opened and a nozzle of 3 mm inner diameter was mounted. With an extrusion instrument "Zwick 1120" the force was determined that was needed to extrude the composition at an extrusion velocity of 60 mm/min. The specified value is an average of the forces measured after 22 mm, 24 mm, 26 mm and 28 mm. After extrusion for 30 mm the experiment was stopped. Similarly, the extrusion force for the second measurement was determined with a cartridge after heat-treatment to simulate ageing of the composition. Here, the cartridges were stored at 60° C. during 7 days and subsequently heated to 80° C. for 1 hour. Then, while still at 80° C., the experiment was performed in the same manner as the first one.

Compression force was determined using a Zwick/Roell Zwicki 1020 test device and using two clean glass sample coupons (40×100×6 mm). A triangular adhesive bead was applied from a cartridge using a triangular nozzle lengthwise to the first glass coupon at 5° C. After waiting for 10 min, the sample with the adhesive bead was placed in the lower sample holder and the second glass coupon was placed in the upper sample holder. Compression was initiated with a test speed of 200 mm/min. The thickness of the compressed bead was 4-5 mm, the width 9-11 mm. Each test was repeated three times to obtain an average value.

Green strength was estimated by measuring the Ultimate Tensile Strength and Total Energy Absorption of a partially cured adhesive sample composition pulled apart in tensile mode at 1 meter per second. For each experiment, two float glass coupons (38×50×6 mm), cleaned by isopropanol and pre-treated with SikaActivator® (a moisture sensitive liquid for the pre-treatment of surfaces to improve adhesion available from Sika Industry, USA) which was applied using a wipe on wipe off procedure to ensure 100% cohesive failure, were used. On the first test coupon, a triangular adhesion bead (height 10-12 mm, width 8-10 mm) was applied at 80° C. over two whole length of the glass coupon. This coupon was placed between two spacers (height 4.5 mm) attached to a base Then, the second test glass coupon was placed on top of the bead to create a adhesion bond with a thickness of 4.5 mm. Immediately after that, the sample was placed in a controlled temperature and humidity environment (for each sample, see the conditions in Table 6). After exactly 30 min, the sample was taken out and measured in a traction machine in tensile mode with a pull speed of 1 m/s. After the measurement, the bead width and length on both glass coupons were measured with a micrometer/caliper. The test machine calculated the maximum tensile stress according to $\delta_{max} = F_{max}/A$, where $\delta_{max}$ is the maximum tensile stress (representing the ultimate tensile strength), $F_{max}$ is the maximum force and A is the adhesive bond area. The total energy absorbed was calculated according to $E = \int F \cdot dx$, where E is the total energy absorbed, F is the force and x is the displacement. All experiments were performed with 5 identical samples under the same condition to obtain an average value.

Determination of Isocyanate Content

The isocyanate content of NCO-functional polymers or prepolymers was determined in % by weight (wt.-%) based on the total weight of the NCO-functional polymer by means of a back titration with excess di-n-butylamine and 0.1 M hydrochloric acid. All determinations were performed semi-manually on a Mettler-Toledo DL50 Graphix titrator with automatic potentiometric endpoint determination. For this purpose, 600-800 mg of the sample to be determined were dissolved under heating in a mixture of 10 ml of isopropanol and 40 ml of xylene, and then reacted with a solution of dibutylamine in xylene. Excess di-n-butylamine was titrated with 0.1M hydrochloric acid and the isocyanate content was calculated therefrom.

Preparation of Inventive Example Compositions

Several inventive examples were prepared to illustrate the effect of the invention.

Two of these inventive compositions, C-1 and C-2, were prepared according to the following procedure: In a first step, an isocyanate-functional polyurethane prepolymer PR1 was produced from a polyisocyanate PI (i.e. methylene diphenyl diisocyanate), a thermoplastic polyester polyol PE, and a bifunctional polyether polyether PO1 (i.e. a polyether diol) suspended in some plasticizer (DIDP). The rest of the ingredients were reacted with the prepolymer PR1 in situ. The details of the ingredients for PR1 and their amounts are listed in Table 1.

TABLE 1

Ingredients for the prepolymer PR1 comprising bifunctional polyether polyol PO1 and thermoplastic polyester polyol PE.

| Amount | Compound | Trade name |
|---|---|---|
| 60.00 parts | PE: Hexanediol adipate with OH number 34.4 and water content <0.05% | Dynacoll ® 7360 (Evonik) |
| 18.00 parts | PO1: Propylene glycol end-capped polyether diol with OH number of 28 and water content of <0.05% | Acclaim ® 4200 (Bayer) |
| 12.00 parts | PI: Methylene diphenyl diisocyanate (MDI) | Mondur ® M (Bayer) |
| 10.00 parts | Diisodecyl Phthalate (DIDP) | Jayflex ™ DIDP (ExxonMobil) |

Furthermore, a catalyst solution comprising catalyst K for curing isocyanate-functional polyurethanes was prepared according to Table 2.

TABLE 2

Ingredients for catalyst K solution comprising catalyst K.

| Amount | Compound | Trade name |
|---|---|---|
| 16.00 parts | Dimorpholine diethyl ether (DMDEE) | Lupragen ® N106 (BASF) |
| 1.80 parts | Dibutyltin dilaurate | Dabco ® T-12 (Air Products) |
| 82.80 parts | Diisodecyl Phthalate (DIDP) | Jayflex ™ DIDP (ExxonMobil) |

An urea-based thixotropy additive TX was prepared according to Table 3.

TABLE 3

Ingredients for urea-based thixotropy additive TX.

| Amount | Compound | Trade name |
|---|---|---|
| 9.81 parts | Methylene diphenyl diisocyanate (MDI) | Mondur ® M (Bayer) |
| 64.18 parts | Diisodecyl Phthalate (DIDP) | Jayflex ™ DIDP (ExxonMobil) |
| 5.18 parts | N-Butylamine | (Sigma Aldrich) |
| 0.13 parts | N-Methyl-2-pyrrolidone | (Sigma Aldrich) |

A first inventive polyurethane composition C-1 was prepared using the above mentioned polyurethane prepolymer PR1 (Table 1), the catalyst solution (Table 2), and the thixotropy additive TX (Table 3). Furthermore, a hydrophobic polyol PH and a trifunctional polyether polyol PO2 were used, as well as additional ingredients, including filler F, additional polyisocyanate PI, and plasticizer. The details of the composition are listed in Table 4.

TABLE 4

Ingredients for inventive adhesive C-1.

| Amount | Compound | Trade name |
|---|---|---|
| 4.00 parts | Prepolymer PR1 of Table 1 | — |
| 20.60 parts | PO2: Polyether triol 20% end-capped with EO, with OH number of 35 and water content <0.05% | Arcol ® E-448 (Bayer) |
| 23.30 parts | PH: Fatty acid based high viscous hydrophobic linear polyol with OH number of 56 and water content <0.05% | PriPlast ® 3190 (Croda) |
| 7.80 parts | PI: Methylene diphenyl diisocyanate (MDI) | Mondur ® M (Bayer) |

TABLE 4-continued

Ingredients for inventive adhesive C-1.

| Amount | Compound | Trade name |
|---|---|---|
| 7.00 parts | Thixotropy additive TX of Table 3 | — |
| 20.00 parts | F: Carbon black powder | Printex ® 60 (Evonik) |
| 9.00 parts | F: Polyvinyl chloride powder | Solvin ® 373MC (Solvay) |
| 6.50 parts | Diisodecyl Phthalate (DIDP) | Jayflex ™ DIDP (Exxon Mobil) |
| 1.80 parts | Catalyst K solution of Table 2 | — |

A second inventive polyurethane composition C-2 was prepared in the same way as C-1, but with slightly different relative amounts of the ingredients. The details of the composition are listed in Table 5.

TABLE 5

Ingredients for inventive adhesive C-2.

| Amount | Compound | Trade name |
|---|---|---|
| 5.00 parts | Prepolymer PR1 of Table 1 | — |
| 20.60 parts | PO2: Polyether triol 20% end-capped with ethylene glycol, with OH number of 35 and water content <0.05% | Arcol ® E-448 (Bayer) |
| 23.30 parts | PH: Fatty acid based high viscous hydrophobic linear polyol with OH number of 56 and water content <0.05% | PriPlast ® 3187 (Croda) |
| 7.80 parts | PI: Methylene diphenyl diisocyanate (MDI) | Mondur ® M (Bayer) |
| 7.00 parts | Thixotropy additive TX of Table 3 | — |
| 20.00 parts | F: Carbon black powder | Printex ® 60 (Evonik) |
| 8.50 parts | F: Polyvinyl chloride powder | Solvin ® 373MC (Solvay) |
| 6.00 parts | Diisodecyl Phthalate (DIDP) | Jayflex ™ DIDP |
| 1.80 parts | Catalyst K solution of Table 2 | — |

Preparation of the Inventive Adhesive Compositions C-1 and C-2

The preparation process of the adhesive compositions involves an in situ reaction between polyisocyanate PI, i.e. methylene diphenyl diisocyanate (MDI), and trifunctional polyether polyol PO2 and hydrophobic polyol PH in the presence of filler F and other parts of the adhesive formulation. The prepolymer PR1, a reaction product of difunctional polyether polyol PO1, thermoplastic polyester polyol PE and polyisocyanate PI (MDI) as described in Table 1, is added later to the batch. A typical production procedure is described as follows:

Plasticizer DIDP, polyols PO2, PH and PI (MDI) were placed into a vacuum mixer and mixed under vacuum for 10 minutes. The material was then heated to above 60° C. while mixing. At 60° C., PVC powder (first filler F) was added, followed by the thixotropic additive TX and carbon black powder (second filler F). The resulting mixture was mixed for 60 minutes while maintaining the temperature at 60±5° C., afterwards the thermoplastic prepolymer PR1 (see Table 1) was added at 60° C. as it is in its liquid state and mixed for 10 minutes. Then, the mixture was cooled down to 50° C., followed by the addition of the catalyst K solution and mixed another 12 minutes under vacuum Two further inventive example adhesive compositions, C-3 and C-4, were prepared using the following procedure by first preparing three additional isocyanate-functional prepolymers PR, namely PR2 to PR4, which were then used in formulations to produce the respective adhesive compositions.

TABLE 6

Ingredients for the prepolymer PR2 comprising bifunctional polyether polyol PO1 and trifunctional polyether polyol PO2.

| Amount | Compound | Trade name |
|---|---|---|
| 64.282 parts | PO2: Polyether triol 20% end-capped with EO, with OH number of 35 and water content <0.05% | Arcol ® E-448 (Bayer) |
| 23.772 parts | PO1: Propylene glycol end-capped polyether diol with OH number of 28 and water content of <0.05% | Acclaim ® 4200 (Bayer) |
| 11.93 parts | PI: Isophorone diisocyanate (IPDI) | Desmodur ® I (Bayer) |
| 0.016 parts | Dibutyltin dilaurate (catalyst) | DABCO ® T-12 (AirProducts) |

The polyether polyol PO1, polyether polyol PO2 and catalyst were combined in a reactor and the mixture heated up to 60° C. under vacuum. IPDI was then added and mixed at 60° C. The mixture was then heated to 80° C. and the reaction continued at 80° C. until the free NCO content reached approximately 2.2% by weight.

The prepolymer PR2 had a theoretical final free NCO content of 2.1 wt.-% and a viscosity of 5,000-20,000 centipoise at 23° C. as measured with a Brookfield Viscometer HBTD by using a spindle number 5 at 100 rpm.

Prepoylmer PR3 was prepared according to the following procedure and the ingredients listed in Table 7.

TABLE 7

Ingredients for the prepolymer PR3 comprising bifunctional polyether polyol PO1 and thermoplastic polyester polyol PE.

| Amount | Compound | Trade name |
|---|---|---|
| 64.585 parts | PO2: Polyether triol 20% end-capped with EO, with OH number of 35 and water content <0.05% | Arcol ® E-448 (Bayer) |
| 19.995 parts | Diisodecyl Phthalate (DIDP) | Jayflex ™ DIDP (Exxon Mobil) |
| 11.387 parts | PI: Methylene diphenyl diisocyanate (MDI) | Mondur ® M (Bayer) |
| 0.016 parts | 33% Triethylene diamine in dipropylene glycol (catalyst) | DABCO ® 33 LV (AirProducts) |
| 0.017 parts | p-Toluene sulfonyl isocyanate (PTSI; drying agent) | PTSI (VanChem) |

The trifunctional polyether polyol PO2, plasticizer and catalyst were combined in a reactor and the mixture heated up to 60° C. under vacuum. MDI was then added and mixed at 60° C. under vacuum until the MDI melted. The mixture was then heated to 80° C. and the reaction continued at 80° C. until the free NCO content reached approximately 2.5% by weight. PTSI was then added to stop further reaction.

The prepolymer PR3 had a theoretical final free NCO content of 2.4 wt.-% and a viscosity of 10,000-40,000 centipoise at 23° C. as measured with a Brookfield Viscometer HBTD by using a spindle number 5 at 100 rpm.

With the same procedure as for the prepolymers PR1, PR2, and PR3, a prepolymer PR4 was prepared according to the ingredients listed in Table 8.

TABLE 8

Ingredients for the prepolymer PR4 comprising bifunctional polyether polyol PO1, hydrophobic polyol PH, and thermoplastic polyester polyol PE.

| Amount | Compound | Trade name |
|---|---|---|
| 38.86 parts | PO1: Propylene glycol end-capped polyether diol with OH number of 28 and water content of <0.05% | Acclaim ® 4200 (Bayer) |
| 21.14 parts | PH: Fatty acid based high viscous hydrophobic linear polyol with OH number of 56 and water content <0.05% | PriPlast ® 3187 (Croda) |
| 4.11 parts | PE: Polyester polyol from dodecanoic diacid and 1,6-hexanediol, OH number 30 and water content <0.05% | Dynacoll ® 7380 (Evonik) |
| 10.89 parts | PI: Methylene diphenyl diisocyanate (MDI) | Mondur ® M (Bayer) |
| 25.00 parts | Diisodecyl Phthalate (DIDP) | Jayflex ® DIDP (Exxon Mobil) |

From the previously prepared prepolymers PR1 to PR4, two inventive adhesive compositions C-3 and C-4 were prepared with the ingredients listed Table 9 and Table 10.

TABLE 9

Ingredients for inventive adhesive C-3.

| Amount | Compound | Trade name |
|---|---|---|
| 10.00 parts | Prepolymer PR1 of Table 1 | — |
| 6.93 parts | Prepolymer PR2 of Table 6 | — |
| 34.35 parts | Prepolymer PR3 of Table 7 | — |
| 2.92 parts | PH: Fatty acid based high viscous hydrophobic linear polyol with OH number of 56 and water content <0.05% | PriPlast ® 3187 (Croda) |
| 9.17 parts | Thixotropy additive TX of Table 3 | — |
| 17.42 parts | F: Carbon black powder | Printex ® 60 (Evonik) |
| 10.85 parts | F: Polyvinyl chloride powder | Solvin ® 373MC (Solvay) |
| 6.50 parts | Diisodecyl Phthalate (DIDP) | Jayflex ™ DIDP (Exxon Mobil) |
| 0.20 | p-Toluene sulfonyl isocyanate (PTSI; drying agent) | PTSI (VanChem) |
| 1.66 parts | Catalyst K solution of Table 2 | — |

TABLE 10

Ingredients for inventive adhesive C-4.

| Amount | Compound | Trade name |
|---|---|---|
| 7.00 parts | Prepolymer PR1 of Table 1 | — |
| 3.50 parts | Prepolymer PR2 of Table 6 | — |
| 32.50 parts | Prepolymer PR3 of Table 7 | — |
| 15.00 parts | Prepolymer PR4 of Table 8 | — |
| 4.30 parts | PH: Fatty acid based high viscous hydrophobic linear polyol with OH number of 56 and water content <0.05% | PriPlast ® 3187 (Croda) |
| 8.00 parts | Thixotropy additive TX of Table 3 | — |
| 18.60 parts | F: Carbon black powder | Printex ® 60 (Evonik) |
| 9.40 parts | F: Polyvinyl chloride powder | Solvin ® 373M0 (Solvay) |
| 0.10 | p-Toluene sulfonyl isocyanate (PTSI; drying agent) | PTSI (VanChem) |
| 1.66 parts | Catalyst K solution of Table 2 | — |

Preparation of the Inventive Adhesive Compositions C-3 and C-4

The preparation process of the adhesive compositions follows a prepolymer-blending procedure including the addition of chain extenders and involves no addition of free polyisocyanate PI in the formulation process of the adhesive.

Plasticizer DIDP (only for C-3), prepolymers PR2, PR3, and PR4 (only for C-4), polyol PH and thixotropic additive TX were placed into a vacuum mixer and mixed under vacuum for 10 minutes at low speed. The material was then heated to above 60° C. while mixing. At 60° C., PVC powder (first filler F) was added, followed by drying agent PTSI and carbon black powder (second filler F). The resulting mixture was mixed for 60 minutes while maintaining the temperature at 60±5° C., afterwards the thermoplastic prepolymer PR1 (see Table 1) was added at 60° C. as it is in its liquid state and mixed for 10 minutes. Then, the mixture was cooled down to 50° C., followed by the addition of the catalyst K solution and mixed another 12 minutes under vacuum.

Performance Testing and Comparison to Products Based on Prior Art

As comparable non-inventive references, two commercially available warm melt windshield adhesives were used. These include SikaTace-ASAP+ and SikaTack®-Sierra, both available from Sika US. These two commercial products do not contain a hydrophobic polyol PH.

The test results are presented in Tables 11 and 12.

TABLE 11

Testing results of inventive compositions C-1 and C-2 in comparison with commercially available reference compositions.

| | | Products made with prior art (references) | | Inventive examples | |
|---|---|---|---|---|---|
| Test | Parameters | SikaTack-ASAP+ | SikaTack-Sierra | C-1 | C-2 |
| Compression force | 10 minutes compression at 5° C. (N/cm) | 9-11 | 12-15 | 10.7 | 8.9 |
| Green strength of material as measured in | 0.5 h Peak stress (MPa) at 23° C./50% r.h. | 0.6 | 0.7 | 1.5 | 1.0 |
| | 0.5 h Peak stress (MPa) at 35° C./20% r.h. | 0.4 | 0.7 | 1.6 | 1.0 |

TABLE 11-continued

Testing results of inventive compositions C-1 and C-2 in comparison with commercially available reference compositions.

| | | Products made with prior art (references) | | Inventive examples | |
|---|---|---|---|---|---|
| Testing of key properties | | SikaTack-ASAP+ | SikaTack-Sierra | | |
| Test | Parameters | | | C-1 | C-2 |
| tensile strength at 1 m/s | 0.5 h Peak stress (MPa) at 5° C./80% r.h. | n/a | 0.9 | 1.1 | 1.6 |
| | 0.5 h Energy (mJ/mm$^2$) at 23° C./50% r.h. | 2.5 | 3.7 | 8.4 | 6.5 |
| | 0.5 h Energy (mJ/mm$^2$) at 35° C./20% r.h. | 1.7 | 3.6 | 9.8 | 5.5 |
| | 0.5 h Energy (mJ/mm$^2$) at 5° C./80% r.h. | n/a | 3.9 | 6.5 | 8.6 |
| Reactivity and open time (tack-free time) | Tack-free time at 23° C./50% r.h. (minutes) | 18 | 12 | 11 | 16 |
| | Tack-free time at 35° C./20% r.h. (minutes) | 20 | 15 | 16 | 22 |
| | Tack-free time at 5° C./80% r.h. (minutes) | 20 | 28 | 10 | 17 |
| Thixotropic properties and storage stability | Nose 7 days 23° C./1 hour 80° C. | 1 | 1 | 1 | 1 |
| | Nose 7 days 60° C./1 hour 80° C. | 1-2 | 1 | 1 | 1 |
| Mechanical properties of cured samples (after cure at 23° C./50% r.h.) | Tensile strength (MPa) | 8.2 | 8.7 | 11.1 | 11.7 |
| | Elongation (%) | 440 | 428 | 546 | 436 |
| | Young's modulus (MPa) | 2.8 | 5.2 | 2.5 | 3.62 |
| | Lapshear strength (MPa) | 6.3 | 5.0 | 7.1 | 5.6 |
| Extrusion force (gunnability and storage stability) | Extrusion force at 80° C. through 3 mm orifice after 7 d 23° C./1 hour 80° C. | 660 | 800 | 1256 | 1073 |
| | Extrusion force at 80° C. through 3 mm orifice after 7 d 60° C./1 hour 80° C. | 680 | 950 | 1452 | 1162 |

"n/a" means no data is available.

TABLE 12

Testing results of inventive compositions C-3 and C-4 in comparison with commercially available reference compositions.

| | | Products made with prior art (references) | | Inventive examples | |
|---|---|---|---|---|---|
| Testing of key properties | | SikaTack-ASAP+ | SikaTack-Sierra | | |
| Test | Parameters | | | C-3 | C-4 |
| Compression force | 10 minutes compression at 5° C. (N/cm) | 9-11 | 12-15 | 10 | 9.1 |
| Green strength of material as measured in tensile strength at 1 m/s | 0.5 h Peak stress (MPa) at 23° C./50% r.h. | 0.6 | 0.7 | 0.8 | 0.8 |
| | 0.5 h Peak stress (MPa) at 35° C./20% r.h. | 0.4 | 0.7 | 0.6 | 0.7 |
| | 0.5 h Peak stress (MPa) at 5° C./80% r.h. | n/a | 0.9 | 1.1 | 1.2 |
| | 0.5 h Energy (mJ/mm$^2$) at 23° C./50% r.h. | 2.5 | 3.7 | 4.3 | 4.3 |
| | 0.5 h Energy (mJ/mm$^2$) at 35° C./20% r.h. | 1.7 | 3.6 | 3.7 | 3.0 |
| | 0.5 h Energy (mJ/mm$^2$) at 5° C./80% r.h. | n/a | 3.9 | 5.0 | 4.8 |
| Reactivity and open time (tack-free time) | Tack-free time at 23° C./50% r.h. (minutes) | 18 | 12 | 11 | 16 |
| | Tack-free time at 35° C./20% r.h. (minutes) | 20 | 15 | 14 | 23 |
| | Tack-free time at 5° C./80% r.h. (minutes) | 20 | 28 | 13 | 19 |

TABLE 12-continued

Testing results of inventive compositions C-3 and C-4 in comparison with commercially available reference compositions.

| Testing of key properties | | Products made with prior art (references) | | Inventive examples | |
|---|---|---|---|---|---|
| | | SikaTack- | SikaTack- | | |
| Test | Parameters | ASAP+ | Sierra | C-3 | C-4 |
| Thixotropic properties and storage stability | Nose 7 days 23° C./ 1 hour 80° C. | 1 | 1 | 1 | 1 |
| | Nose 7 days 60° C./ 1 hour 80° C. | 1-2 | 1 | 1 | 1 |
| Mechanical properties of cured samples (after cure at 23° C./50% r.h.) | Tensile strength (MPa) | 8.2 | 8.7 | 8.18 | 9.04 |
| | Elongation (%) | 440 | 428 | 478 | 519 |
| | Young's modulus (MPa) | 2.8 | 5.2 | 2.97 | 2.67 |
| | Lapshear strength (MPa) | 6.3 | 5.0 | 6.4 | 6.83 |
| Extrusion force (gunnability and storage stability) | Extrusion force at 80° C. through 3 mm orifice after 7 d 23° C./1 hour 80° C. | 660 | 800 | 621 | 664 |
| | Extrusion force at 80° C. through 3 mm orifice after 7 d 60° C./1 hour 80° C. | 680 | 950 | 733 | 824 |

"n/a" means no data is available.

The results in Tables 11 and 12 clearly show that the inventive example compositions C-1 to C-4 exhibit a significantly higher green strength than the reference products, independent from the application temperature. At the same time, the inventive examples do not suffer from poor storage stability, low reactivity/open time, or poor mechanical properties. They furthermore show comparable or superior tensile strength and the same thixotropic properties compared to the reference products.

Preparation of Additional Experiments

Two additional non-inventive reference experiments were prepared, R-1 and R-2, both with the same procedure as C-1 (see above). The composition details of R-1 are shown in Table 13.

TABLE 13

Ingredients for non-inventive adhesive R-1.

| Amount | Compound | Trade name |
|---|---|---|
| 5.00 parts | Prepolymer PR1 of Table 1 | — |
| 20.60 parts | PO2: Polyether triol 20% end-capped with EO, with OH number of 35 and water content <0.05% | Arcol ® E-448 (Bayer) |
| 18.10 parts | PO1: Propylene glycol end-capped polyether diol with OH number of 28 and water content of <0.05% | Acclaim ® 4200 (Bayer) |
| 2.60 parts | PO1: Propylene glycol diol with OH number of 112 and water content of <0.05% | Poly-G ® 20-112 (Brenntag) |
| 2.00 parts | PO1: Propylene glycol diol with OH number of 56 and water content of <0.05% | Terathane ® PTMEG 2000 (Brenntag) |
| 6.80 parts | PI: Methylene diphenyl diisocyanate (MDI) | Mondur ® M (Bayer) |
| 5.00 parts | Thixotropy additive TX of Table 3 | — |
| 16.00 parts | F: Carbon black powder | Printex ® 60 (Evonik) |
| 15.00 parts | F: Polyvinyl chloride powder | Solvin ® 373MC (Solvay) |
| 4.60 parts | Diisodecyl Phthalate (DIDP) | Jayflex ™ DIDP (Exxon Mobil) |
| 1.80 parts | Catalyst K solution of Table 2 | — |

The composition details of the non-inventive reference example R-2 are shown in Table 14.

TABLE 14

Ingredients for non-inventive adhesive R-2.

| Amount | Compound | Trade name |
|---|---|---|
| 5.00 parts | Prepolymer PR1 of Table 1 | — |
| 20.60 parts | PO2: Polyether triol 20% end-capped with EO, with OH number of 35 and water content <0.05% | Arcol ® E-448 (Bayer) |

TABLE 14-continued

Ingredients for non-inventive adhesive R-2.

| Amount | Compound | Trade name |
|---|---|---|
| 12.00 parts | PO1: Propylene glycol end-capped polyether diol with OH number of 28 and water content of <0.05% | Acclaim ® 4200 (Bayer) |
| 3.30 parts | PO1: Propylene glycol diol with OH number of 112 and water content of <0.05% | Poly-G ® 20-112 (Brenntag) |
| 8.00 parts | PO1: Propylene glycol diol with OH number of 56 and water content of <0.05% | Terathane ® PTMEG 2000 (Brenntag) |
| 6.80 parts | PI: Methylene diphenyl diisocyanate (MDI) | Mondur ® M (Bayer) |
| 5.00 parts | Thixotropy additive TX of Table 3 | — |
| 16.00 parts | F: Carbon black powder | Printex ® 60 (Evonik) |
| 15.00 parts | F: Polyvinyl chloride powder | Solvin ® 373MC (Solvay) |
| 5.50 parts | Diisodecyl Phthalate (DIDP) | Jayflex ™ DIDP (Exxon Mobil) |
| 1.80 parts | Catalyst K solution of Table 2 | — |

Two additional inventive experiments were prepared, C-5 and C-6, both with the same procedure as C-1 (see above). The composition details of C-5 are shown in Table 15.

TABLE 15

Ingredients for inventive adhesive C-5.

| Amount | Compound | Trade name |
|---|---|---|
| 5.50 parts | Prepolymer PR1 of Table 1 | — |
| 20.60 parts | PO2: Polyether triol 20% end-capped with EO, with OH number of 35 and water content <0.05% | Arcol ® E-448 (Bayer) |
| 23.30 parts | PH: Fatty acid based high viscous hydrophobic linear polyol with OH number of 56 and water content <0.05% | PriPlast ® 3190 (Croda) |
| 7.80 parts | PI: Methylene diphenyl diisocyanate (MDI) | Mondur ® M (Bayer) |
| 8.00 parts | Thixotropy additive TX of Table 3 | — |
| 20.00 parts | F: Carbon black powder | Printex ® 60 (Evonik) |
| 10.00 parts | F: Polyvinyl chloride powder | Solvin ® 373MC (Solvay) |
| 7.00 parts | Diisodecyl Phthalate (DIDP) | Jayflex ™ DIDP (Exxon Mobil) |
| 1.80 parts | Catalyst K solution of Table 2 | — |

The composition details of C-6 are shown in Table 16.

TABLE 16

Ingredients for inventive adhesive C-6.

| Amount | Compound | Trade name |
|---|---|---|
| 4.00 parts | Prepolymer PR1 of Table 1 | — |
| 18.60 parts | PO2: Polyether triol 20% end-capped with EO, with OH number of 35 and water content <0.05% | Arcol ® E-448 (Bayer) |
| 4.95 parts | PO1: Propylene glycol diol with OH number of 112 and water content of <0.05% | Poly-G ® 20-112 (Brenntag) |
| 18.59 parts | PH: Fatty acid based high viscous hydrophobic linear polyol with OH number of 70 and water content <0.05% | PriPlast ® 3186 (Croda) |
| 8.67 parts | PI: Methylene diphenyl diisocyanate (MDI) | Mondur ® M (Bayer) |
| 7.00 parts | Thixotropy additive TX of Table 3 | — |
| 16.00 parts | F: Carbon black powder | Printex ® 60 (Evonik) |
| 15.00 parts | F: Whitex Clay | — |
| 4.00 parts | Diisodecyl Phthalate (DIDP) | Jayflex ™ DIDP (Exxon Mobil) |
| 1.70 parts | Catalyst K solution of Table 2 | — |

Performance testing of inventive compositions C-5 and C-6 and reference compositions R-1 and R-2

The test results after testing according to the above-specified methods of compositions C-5, C-6, R-1, and R-2 are shown in Table 17. The results in Table 17 and in comparison with Tables 11 and 12 clearly show that the inventive example compositions C-1 to C-6 exhibit a significantly higher green strength than the reference products, independent from the application temperature. At the same time, the inventive examples do not suffer from poor storage stability, low reactivity/open time, or poor mechanical properties. They furthermore show comparable or superior tensile strength and the same thixotropic properties compared to the reference products.

TABLE 17

Testing results of inventive compositions C-3 and C-4 in comparison with reference compositions R-1 and R-2.

| Testing of key properties | | Reference examples | | Inventive examples | |
|---|---|---|---|---|---|
| Test | Parameters | R-1 | R-2 | C-5 | C-6 |
| Compression force | 10 minutes compression at 5° C. (N/cm) | 6.3 | 11.8 | 12.3 | 11.3 |
| Green strength of material as measured in | 0.5 h Peak stress (MPa) at 23° C./50% r.h. | 0.62 | 0.84 | 1.60 | 1.01 |
| | 0.5 h Peak stress (MPa) at 35° C./20% r.h. | 0.45 | 0.58 | 1.08 | 0.93 |

TABLE 17-continued

Testing results of inventive compositions C-3 and C-4 in comparison with reference compositions R-1 and R-2.

| Testing of key properties | | Reference examples | | Inventive examples | |
|---|---|---|---|---|---|
| Test | Parameters | R-1 | R-2 | C-5 | C-6 |
| tensile strength at 1 m/s | 0.5 h Peak stress (MPa) at 5° C./80% r.h. | 0.95 | 1.39 | 1.97 | 1.81 |
| | 0.5 h Energy (mJ/mm$^2$) at 23° C./50% r.h. | 3.26 | 3.57 | 9.33 | 8.17 |
| | 0.5 h Energy (mJ/mm$^2$) at 35° C./20% r.h. | 2.01 | 2.38 | 5.56 | 6.43 |
| | 0.5 h Energy (mJ/mm$^2$) at 5° C./80% r.h. | 3.81 | 5.23 | 11.14 | 10.69 |
| Reactivity and open time (tack-free time) | Tack-free time at 23° C./50% r.h. (minutes) | 15 | 14 | 11 | 9 |
| | Tack-free time at 35° C./20% r.h. (minutes) | 17 | 20 | 16 | 13 |
| | Tack-free time at 5° C./80% r.h. (minutes) | 23 | 23 | 10 | 10 |
| Thixotropic properties and storage stability | Nose 7 days 23° C./1 hour 80° C. | 1 | 1 | 1 | 1 |
| | Nose 7 days 60° C./1 hour 80° C. | 1 | 1 | 1 | 1 |
| Mechanical properties of cured samples (after cure at 23° C./50% r.h.) | Tensile strength (MPa) | 9.5 | 8.9 | 14.1 | 11.3 |
| | Elongation (%) | 491 | 514 | 628 | 445 |
| | Young's modulus (MPa) | n/a | n/a | 2.77 | 4.7 |
| | Lapshear strength (MPa) | 5.69 | 6.95 | 7.79 | 7.4 |
| Extrusion force (gunnability and storage stability) | Extrusion force at 80° C. through 3 mm orifice after 7 d 23° C./1 hour 80° C. | 569 | 921 | 1241 | 977 |
| | Extrusion force at 80° C. through 3 mm orifice after 7 d 60° C./1 hour 80° C. | 621 | 847 | 1444 | 1006 |

"n/a" means no data is available.

The invention claimed is:

1. One-part polyurethane composition, comprising the reaction product of
   A) at least one polyether polyol PO;
   B) at least one thermoplastic polyester polyol PE;
   C) at least one hydrophobic polyol PH;
   D) at least one polyisocyanate PI;
   wherein the composition has a remaining isocyanate content of between 0.8 and 3.5 wt.-%, based on the total weight of the isocyanate-functional polymers comprised therein,
   wherein said polyether polyol PO comprises a bifunctional polyether polyol PO1 and a trifunctional polyether polyol PO2 and wherein said hydrophobic polyol PH is a polyester polyol based on fatty acids.

2. One-part polyurethane composition according to claim 1, wherein said polyester polyol PE comprises poly(1,6-hexamethylene adipate).

3. One-part polyurethane composition according to claim 1, wherein said hydrophobic polyol PH has an OH value of 30 to 75 mg KOH/g.

4. One-part polyurethane composition according to claim 1, wherein said hydrophobic polyol PH has a viscosity at 25° C. according to ASTM D4878-15 of between 5 Pa s and 150Pa s.

5. One-part polyurethane composition according to claim 1, wherein the composition further comprises
   E) at least one catalyst K for curing isocyanate-functional polyurethanes;
   F) at least one filler F;
   G) optionally a thixotropy additive TX;
   H) optionally at least one plasticizer.

6. One-part polyurethane composition according to claim 5, wherein said thixotropy additive TX is the reaction product of MDI and N-butylamine, suspended in a plasticizer, and wherein said thixotropy additive TX is essentially free of isocyanate groups.

7. Method of manufacturing a one-part polyurethane composition according to claim 5, at least comprising the steps of
   a) mixing polyester polyol PE, difunctional polyether polyol PO1, and parts of polyisocyanate PI to form an isocyanate-functional prepolymer PR;
   b) mixing trifunctional polyether polyol PO2, hydrophobic polyol PH, and the rest of polyisocyanate PI;
   c) adding filler and optionally thixotropy additive TH;
   d) adding prepolymer PR prepared under step a);
   e) adding catalyst for curing isocyanate-functional polyurethanes;
   wherein all steps optionally include the addition of plasticizer, heating, cooling, and/or use of vacuum or inert gas.

8. A method comprising applying a one-part polyurethane composition according to claim 1 as an adhesive or sealant.

9. A method according to claim 8, wherein the one-part polyurethane composition is used as an adhesive for glass, metal, or ceramic frit substrates.

10. A method according to claim 8, wherein the one-part polyurethane composition is heated to an application temperature of between 30° C. and 120° C.

11. A method according to claim 8, wherein the one-part polyurethane composition is used to bond a window or windshield to a building or vehicle.

12. Cured one-part polyurethane composition according to claim 1.

13. Manufacturing product comprising a one-part polyurethane composition according to claim 1.

* * * * *